(12) United States Patent
Hawley (10) Patent No.: US 12,157,485 B2
(45) Date of Patent: Dec. 3, 2024

(54) TRUCK BED HAULING WARNING SYSTEM FOR SHIFTING LOADS

(71) Applicant: Toyota Motor Engineering & Manufacturing North America, Inc., Plano, TX (US)

(72) Inventor: Thomas S. Hawley, Ann Arbor, MI (US)

(73) Assignees: Toyota Motor Engineering & Manufacturing North America, Inc., Plano, TX (US); Toyota Jidosha Kabushiki Kaisha (JP)

(*) Notice: Subject to any disclaimer, the term of this patent is extended or adjusted under 35 U.S.C. 154(b) by 203 days.

(21) Appl. No.: 17/964,806

(22) Filed: Oct. 12, 2022

(65) Prior Publication Data

US 2024/0124007 A1    Apr. 18, 2024

(51) Int. Cl.
| | |
|---|---|
| *B60W 40/13* | (2012.01) |
| *B60R 1/00* | (2022.01) |
| *B60W 50/14* | (2020.01) |
| *B60W 60/00* | (2020.01) |
| *G06T 7/70* | (2017.01) |
| *G06V 20/56* | (2022.01) |
| *G06V 20/59* | (2022.01) |

(52) U.S. Cl.
CPC ............ *B60W 50/14* (2013.01); *B60W 40/13* (2013.01); *B60W 60/001* (2020.02); *G06T 7/70* (2017.01); *G06V 20/56* (2022.01); *G06V 20/59* (2022.01); *B60W 2050/146* (2013.01); *B60W 2420/403* (2013.01); *B60W 2556/40* (2020.02); *G06T 2207/30252* (2013.01); *G06T 2207/30268* (2013.01)

(58) Field of Classification Search
None
See application file for complete search history.

(56) References Cited

U.S. PATENT DOCUMENTS

| | | |
|---|---|---|
| 6,157,889 A | 12/2000 | Baker |
| 10,629,016 B1 | 4/2020 | Helm |
| 10,717,381 B2 | 7/2020 | Chu |
| 11,062,582 B1 | 7/2021 | Van Wiemeersch et al. |
| 11,200,476 B2 | 12/2021 | Prabhakar |
| 11,223,928 B1 | 1/2022 | Wiesenberg et al. |
| 11,247,691 B2 | 2/2022 | Almahmoud et al. |
| 2012/0229639 A1 | 9/2012 | Singleton |
| 2017/0113607 A1 | 4/2017 | Corrales et al. |
| 2017/0351268 A1* | 12/2017 | Anderson ............ G07C 5/0825 |

(Continued)

FOREIGN PATENT DOCUMENTS

| | | |
|---|---|---|
| CN | 201716827 U | 1/2011 |
| JP | H11130265 A | 5/1999 |

*Primary Examiner* — John F Mortell
(74) *Attorney, Agent, or Firm* — Snell & Wilmer LLP (57) ABSTRACT

Methods, systems, and apparatus for a monitoring system to monitor and detect a vehicle load. The monitoring system includes a first camera configured to capture first image data including a load in the vehicle, a memory configured to store image data, and an electronic control unit coupled to the first camera and the memory. The electronic control unit is configured to obtain, from the first camera, the first image data including the load, determine a movement of the load based on the first image data, and provide a notification when the movement of the load exceeds a first threshold.

19 Claims, 7 Drawing Sheets

(56) References Cited

U.S. PATENT DOCUMENTS

| | | |
|---|---|---|
| 2018/0220081 A1 | 8/2018 | Lewis et al. |
| 2020/0031284 A1 | 1/2020 | Onica |
| 2020/0255004 A1 | 8/2020 | Raichelgauz et al. |
| 2021/0248396 A1 | 8/2021 | Sim et al. |
| 2022/0207278 A1* | 6/2022 | Nagata .................... H04N 5/77 |
| 2022/0227356 A1* | 7/2022 | Gould .................. H04W 4/029 |

* cited by examiner

TRUCK BED HAULING WARNING SYSTEM FOR SHIFTING LOADS

BACKGROUND

Field

This disclosure relates to monitoring a load in a vehicle, and detecting any change in position of the load.

Description of the Related Art

While travelling in a vehicle, a driver typically cannot see the bed or the rear compartments of the vehicle. In certain situations, the load that has been loaded in the vehicle may be completely out of view of the driver, or it is unsafe to monitor the load while driving. The driver may not know how the load is behaving while driving. For instance, the load may be undesirably shifting, which is concerning when the load is fragile or falling out of the bed of the vehicle.

Accordingly, there is a need for a system and a method for safely monitoring, detecting, and providing notifications regarding the activities of the load so the driver may stop to resecure and/or retrieve the load.

SUMMARY

In general, one aspect of the subject matter described in this disclosure may be embodied in a monitoring system for a vehicle. The monitoring system includes a first camera configured to capture first image data including a load in the vehicle, a memory configured to store image data, and an electronic control unit coupled to the first camera and the memory. The electronic control unit is configured to obtain, from the first camera, the first image data including the load, determine a movement of the load based on the first image data, and provide a notification when the movement of the load exceeds a first threshold.

In another aspect, the subject matter may be embodied in a method for notifying a user of an output device of a movement of a load within a vehicle. The method includes obtaining, by a processor and from a first camera, first image data of a compartment of the vehicle including the load, determining, by the processor, a movement of the load within the compartment of the vehicle, and providing, by the processor, a notification when the movement of the load exceeds a first threshold.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for monitoring the load in a truck bed or inside a vehicle and detecting undesirable movement of the load. Particular embodiments of the subject matter described in this disclosure may be implemented to realize one or more of the following advantages. The monitoring system includes at least one camera that is mounted on a top of a cab facing the truck bed to identify hauling loads, and track if these loads have shifted or are shifting while driving. The driver receives messages if the loads have shifted, for instance, thus ensuring the driver may haul large items with confidence. The driver is alerted if a load has shifted beyond a certain threshold so they can determine whether the load needs to be resecured.

Particularly, the system sets a baseline of the load position by taking multiple images prior to driving and for the first X meters, where X is 100 meters, for example. To improve the image detection, comparing the images in the first 100 meters differentiates the background from the load in the bed. The system continues to monitor the load (either continuously or periodically, every 10 meters, for example), and when the movement of any object exceeds a first threshold, a warning may be displayed along with the camera image of the bed. As described herein, the driver may decide to address the notification immediately or continue to monitor for further changes.

Figure 1:
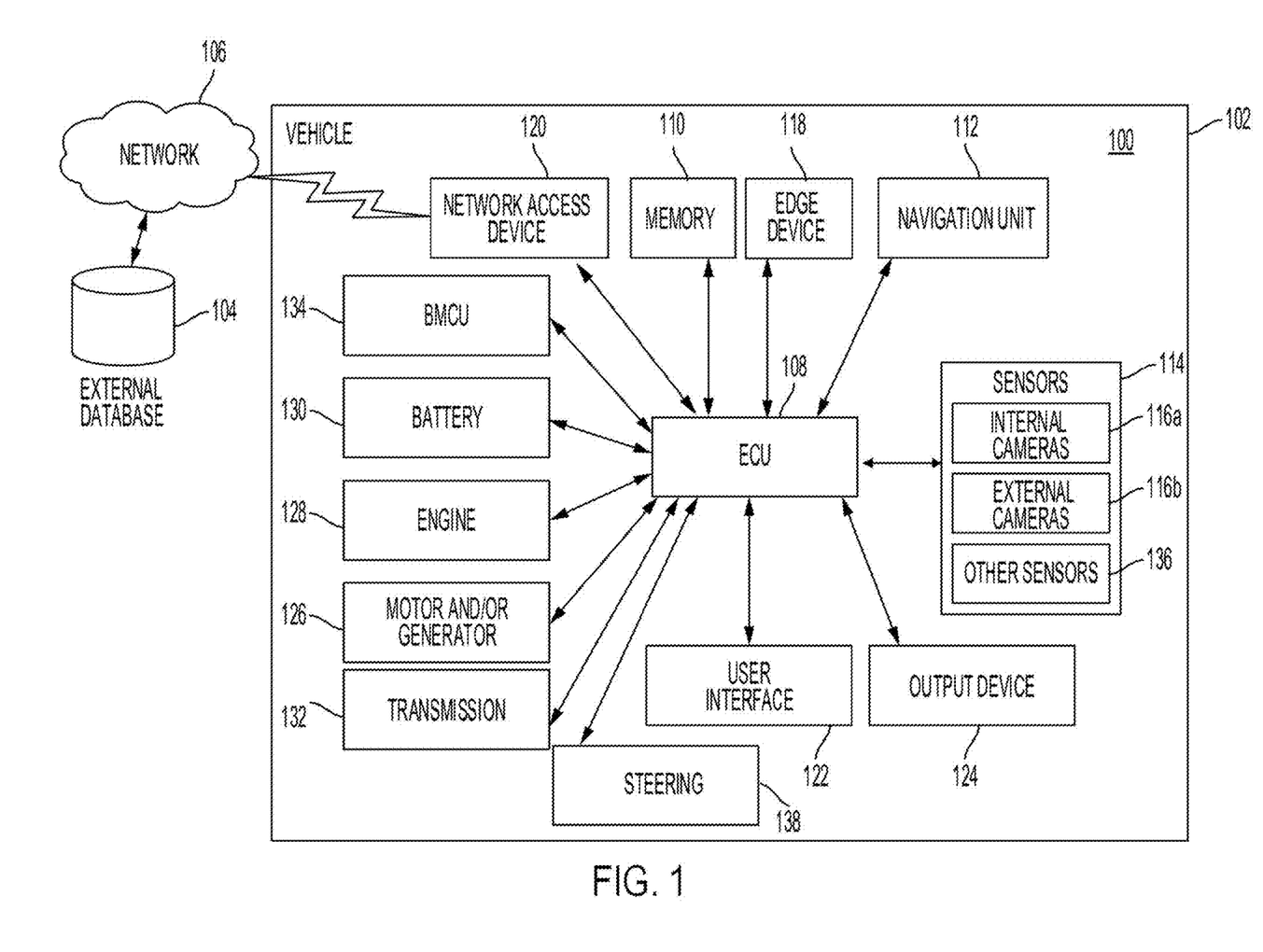
FIG. 1 is a block diagram of an example monitoring system according to an aspect of the invention.

FIG. 1 is a block diagram of a monitoring system 100. The monitoring system 100 may be retro-fitted, coupled to, include or be included within a vehicle 102. The monitoring system 100 may also couple, connect to, or include an external database 104. The monitoring system 100 may connect to a network 106 that links the external database 104 with the vehicle 102. The network 106 may be a local area network (LAN), a wide area network (WAN), a cellular network, the Internet, or combination thereof, that connects, couples and/or otherwise communicates between the vehicle 102 and the external database 104.

The monitoring system 100 monitors the load of the vehicle and detects, identifies, and/or monitors movement that occurs within the vehicle 102. The monitoring system 100 may activate (e.g., turn on) just prior to the activity and record and capture image data before, during and after the occurrence of the activity. The monitoring system 100 may use artificial intelligence including a machine learning algorithm to predict when an activity is about to or has occurred. The monitoring system 100 may couple, connect to, or include an internal edge computing device 118 for rapid and efficient processing at the location of the load within the vehicle 102. The internal edge computing device 118 may include one or more of a central processing unit (CPU), a graphics processing unit (GPU), a tensor processing unit (TPU), a neural processing unit (NPU), etc. The edge computing device 118 may include a relational database or behavioral model database that provides models of normal motions and/or features of different objects or individuals. The edge computing device 118 may be updated and/or provide updates in real-time. The edge computing device 118 may store and/or provide the models to the ECU 108.

The monitoring system 100 may include or be retro-fitted or otherwise coupled with the vehicle 102. A vehicle 102 is a conveyance capable of transporting a person, an object, or a permanently or temporarily affixed apparatus. The vehicle 102 may be a self-propelled wheeled conveyance, such as a car, sports utility vehicle, truck, bus, van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

In various embodiments, the vehicle 102 may be configured to tow (e.g., be configured as a towing vehicle) another vehicle, a trailer, etc. (e.g., a towed vehicle). A towing rod or bar may be used to secure and attach the towing vehicle to the towed vehicle. The towing vehicle may have a bumper and/or a connector that is used to connect the towing vehicle to the towing rod or bar, which is connected to a bumper and/or a connector of the towed vehicle. In various embodiments, the towed vehicle may be a boat, a flatbed trailer (with or without another vehicle stowed thereon), a box trailer, etc. In various aspects, the towing vehicle may be a motorhome or a recreational vehicle (RV), for example, configured to tow a towed vehicle (e.g., a sports utility vehicle (SUV)) where the towed vehicle is being flat towed (i.e., all wheels are on the ground). Accordingly, the monitoring system 100 may be configured to detect, identify and/or monitor the towed vehicle and/or a load in the towed vehicle (e.g., a load positioned in the trailer).

The monitoring system 100 includes one or more processors, such as an electronic control unit (ECU) 108 and a memory 110. The monitoring system 100 may include other components, such as a navigation unit 112, one or more sensors 114 including one or more internal cameras 116a, one or more external cameras 116b, a network access device 120, a user interface 122, and an output device 124. The monitoring system 100 may also include other sensors 136, such as a vehicle speed sensor and a proximity sensor. The monitoring system 100 may also couple, connect to, and/or include one or more vehicle components such as a motor and/or generator 126, an engine 128, a battery 130, a transmission 132 and/or a battery management control unit (BMCU) 134.

The ECU 108 may be implemented as a single ECU or as multiple ECUs. The ECU 108 may be electrically coupled to some or all of the other components within the vehicle 102, such as the motor and/or generator 126, the transmission 132, the engine 128, the battery 130, the battery management control unit (BMCU) 134, the memory 110, the network access device 120, and/or the one or more sensors 114. The ECU 108 may include one or more processors or controllers specifically designed for predicting activities within the vehicle 102. The ECU 108 may generate predictive models and use machine learning algorithms to anticipate activities before the activities occur.

The ECU 108 may analyze the external and/or internal environment of the vehicle 102 and compare the data to a baseline and/or input the data into a model to anticipate, predict or otherwise determine any activities within the environment. If an activity is predicted or otherwise detected, the ECU 108 may act to record, document, provide or otherwise act to mitigate consequences of the activity. The ECU 108 may be coupled to a memory 110 and execute instructions that are stored in the memory 110.

The memory 110 may be coupled to the ECU 108 and store instructions that the ECU 108 executes. The memory 110 may include one or more of a Random Access Memory (RAM) or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 108. Moreover, the memory 110 may be used to record and store image data before, after and/or during the occurrence of the activity to document the activity.

The monitoring system 100 may include the user interface 122. The monitoring system 100 may display one or more notifications on the user interface 122. The one or more notifications on the user interface 122 may notify occupants of the vehicle 102 when the monitoring system 100 is initialized or activated. The user interface 122 may include an input/output device that receives user input from a user interface element, a button, a dial, a microphone, a keyboard, or a touch screen. For example, the user interface 122 may receive user input that may include configurations as to the amount of image data or the length of the video to record when an activity is detected. The user interface 122 may also receive user input that may include configurations as to when to activate cameras 116a-b (e.g., when to commence monitoring, how sensitive/what level of monitoring should occur) and when to transmit a notification to an output device 124. The output device 124 may be, for example, a display, such as a head up display (HUD) in the windshield, a multi-information display (MID) in the dashboard, and/or an IVI display. For example, each of the HUD, the MID, and the IVI display may display a notification icon indicating a shift in the load as exceeding a first threshold. In response, the driver may ignore the notification, clear the notification, or instruct the monitoring system 100 to continue to monitor the load until it exceeds a second threshold. Additionally, or alternatively, the output device 124 may be a display on a mobile device. A mobile device may also include a user interface 122. In other examples, the output device 124 may be a speaker, an audio and/or visual indicator, or a refreshable braille display.

The monitoring system 100 may include a network access device 120. The network access device 120 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 120 may transmit data to and receive data from the external database 104. For example, the ECU 108 may communicate with the external database 104 to obtain information about entities near the location of the vehicle 102, via the network 106.

The monitoring system 100 may include a navigation unit 112 and/or one or more sensors 114. The navigation unit 112 may be integral to the vehicle 102 or a separate unit coupled to the vehicle 102, such as a personal device with navigation capabilities. When the navigation unit 112 is separate from the vehicle 102, the navigation unit 112 may communicate with the vehicle 102 via the network access device 120. The vehicle 102 may include a Global Positioning System (GPS) unit (not shown) for detecting location data including a current location of the vehicle 102 and date/time information instead of the navigation unit 112. In that regard, the ECU 108 may perform the functions of the navigation unit 112 based on data received from the GPS unit. At least one of the navigation unit 112 or the ECU 108 may predict or propose a route set that includes a starting location and a destination location. The navigation unit 112 or the ECU 108 may perform navigation functions. Navigation functions may include, for example, route and route set prediction, providing navigation instructions, and receiving user input such as verification of predicted routes and route sets or destinations.

The navigation unit 112 may provide and obtain navigational map information including location data, which may include a current location, a starting location, a destination location and/or a route between the starting location or current location and the destination location of the vehicle 102. The navigation unit 112 may include a memory (not shown) for storing the route data. The navigation unit 112 may receive data from other sensors capable of detecting data corresponding to location information. For example, the other sensors may include a gyroscope or an accelerometer.

Figure 3:
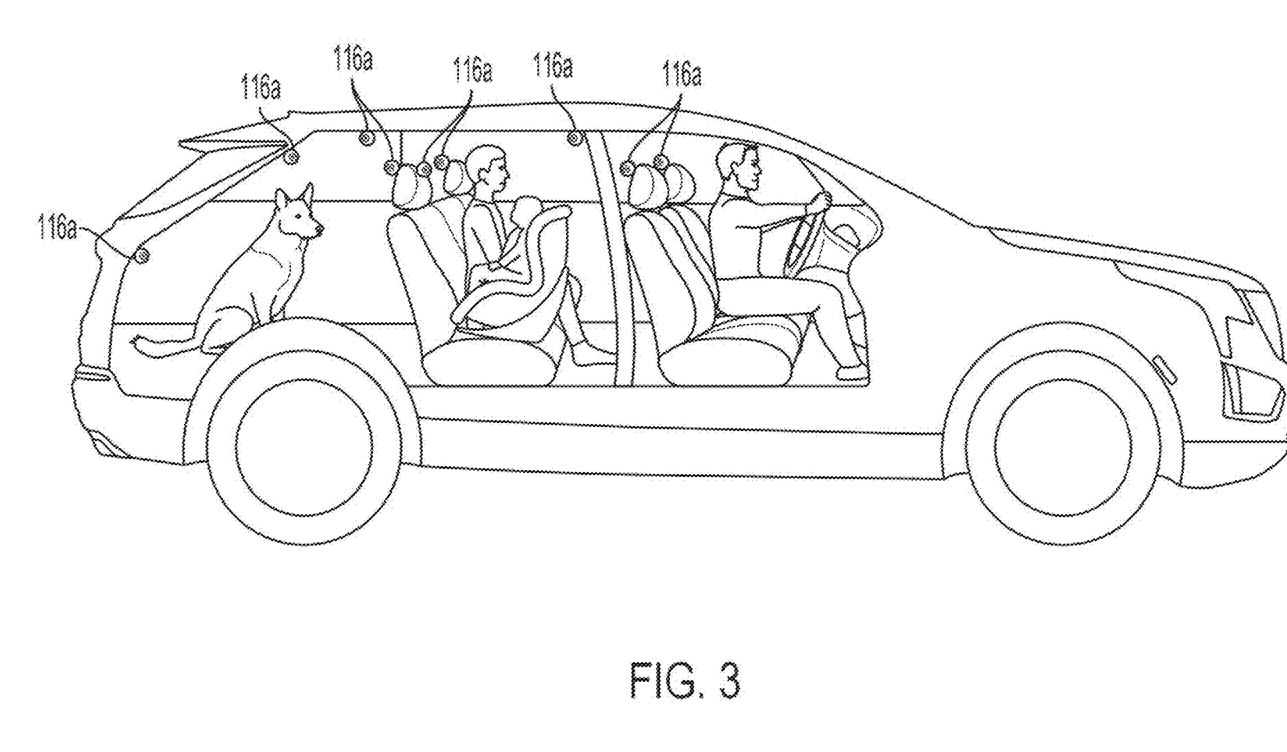
FIG. 3 shows an example illustration of the positioning of one or more internal cameras of the monitoring system of FIG. 1 within the vehicle according to an aspect of the invention.

The one or more sensors 114 may include one or more internal cameras 116a, one or more external cameras 116b, and/or other sensors 136. The one or more internal cameras 116a may include multiple cameras positioned within the vehicle 102 to capture different views within the cabin of the vehicle 102, as shown in FIG. 3 for example. The one or more internal cameras 116a may be positioned within the vehicle 102, such as on the back of the front row seats to capture a view of the rear seats, or on the back of the rear seats to capture a view of the cargo area behind the seats of the vehicle. The one or more internal cameras 116a may be positioned near the rear window and directed outward of a pickup truck or placed on a bed rail in the truck bed, for example, to capture a view of the truck bed. The one or more internal cameras may be positioned in the ceiling. The one or more internal cameras 116a may capture image data that includes a single frame or image or a continuous video of the environment inside or within the vehicle 102. The different views within the vehicle may be used to form a panoramic or 360 degrees image of the entire cabin, which allows the monitoring system 100 to capture activities within the vehicle 102, such as a load (e.g., a fragile item that has shifted into an undesirable position). The one or more internal cameras 116a may be portable cameras that could be easily attached or installed within the vehicle 102 by a user and powered through power sources in the vehicle 102, such as through USB connectors.

Figure 4A:
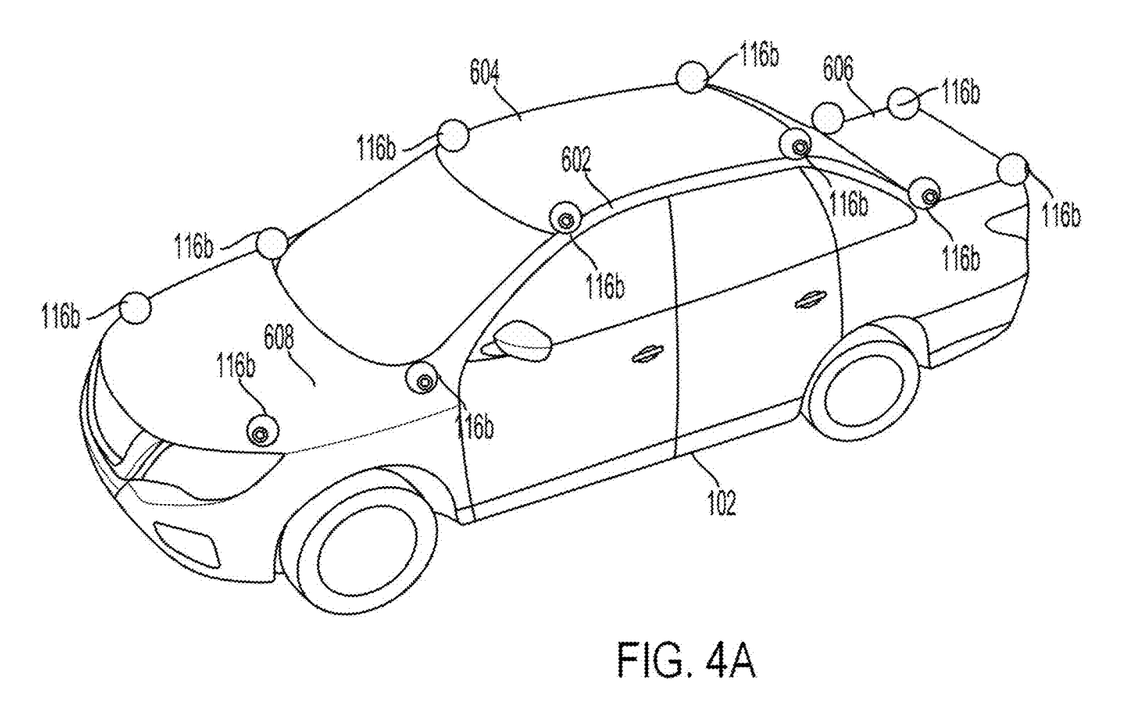
FIGS. 4A-4B show example illustrations of the positioning of one or more external cameras of the monitoring system of FIG. 1 on the vehicle according to an aspect of the invention.
Figure 4B:
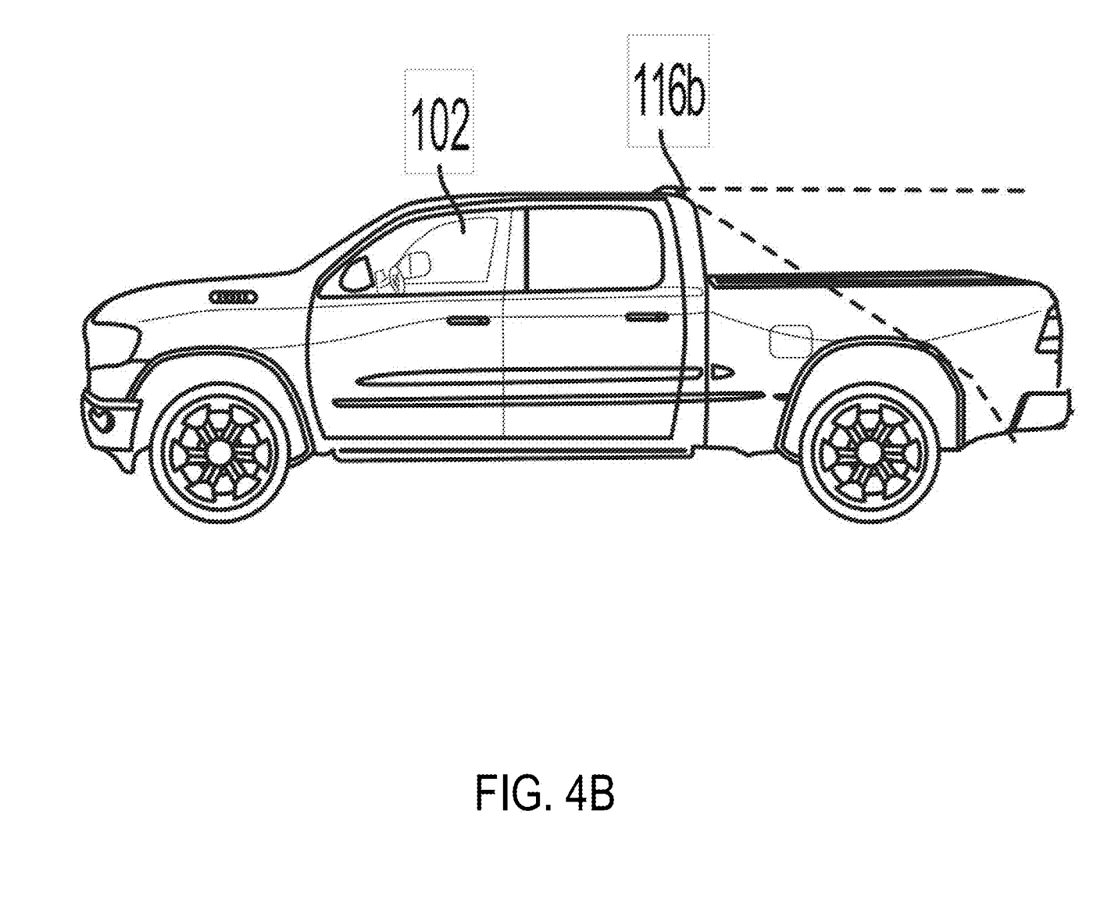

The one or more external cameras 116b may include multiple cameras positioned on the outside of the vehicle 102 to capture different views of the surrounding environment outside the vehicle 102, as shown in FIGS. 4A-4B, for example. The one or more external cameras 116b may be positioned along a frame 602 of the vehicle 102, such as along a roof 604, a trunk 606, or a front 608 of the vehicle 102. Particularly, an external camera 116b may be positioned on the top of a cab of the vehicle 102 (e.g., a truck). The different views of the surrounding environment may be used to form a panoramic or 360 degrees image of the surrounding environment outside the vehicle 102. The one or more external cameras 116b may capture image data that includes a single frame or image or a continuous video of the surrounding environment outside the vehicle 102, which allows the monitoring system 100 to capture activities within the bed of the vehicle 102 and outside of the vehicle 102 which may improve the detection of the load by capturing images to differentiate between the load and the surrounding background noise.

The monitoring system 100 may couple, connect to, and/or include one or more vehicle components. The one or more vehicle components may include the motor and/or generator 126. The motor and/or generator 126 may convert electrical energy into mechanical power, such as torque, and may convert mechanical power into electrical energy. The motor and/or generator 126 may be coupled to the battery 130. The motor and/or generator 126 may convert the energy from the battery 130 into mechanical power, and may provide energy back to the battery 130, for example, via regenerative braking. The vehicle 102 may include one or more additional power generation devices such as the engine 128 or a fuel cell stack (not shown). The engine 128 combusts fuel to provide power instead of and/or in addition to the power supplied by the motor and/or generator 126.

The battery 130 may be coupled to the motor and/or generator 126 and may provide electrical energy to and receive electrical energy from the motor and/or generator 126. The battery 130 may include one or more rechargeable batteries.

The BMCU 134 may be coupled to the battery 130 and may control and manage the charging and discharging of the battery 130. The BMCU 134, for example, may measure, using battery sensors, parameters used to determine the state of charge (SOC) of the battery 130. The BMCU 134 may control the battery 130.

The one or more vehicle components may include the transmission 132. The transmission 132 may have different gears and/or modes, such as park, drive and/or neutral and may shift between the different gears. The transmission 132 manages the amount of power that is provided to the wheels of the vehicle 102 given an amount of speed. The one or more vehicle components may include a steering device 138. The steering device 138 controls the direction of the movement of the vehicle 102 to follow a desired course.

The monitoring system 100 may include or be coupled to the external database 104. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may be a relational database or behavioral model database that provides models of normal motions and/or features of different objects or individuals. The external database 104 may be updated and/or provide updates in real-time. The external database 104 may store and/or provide the models to the ECU 108.

Figure 2:
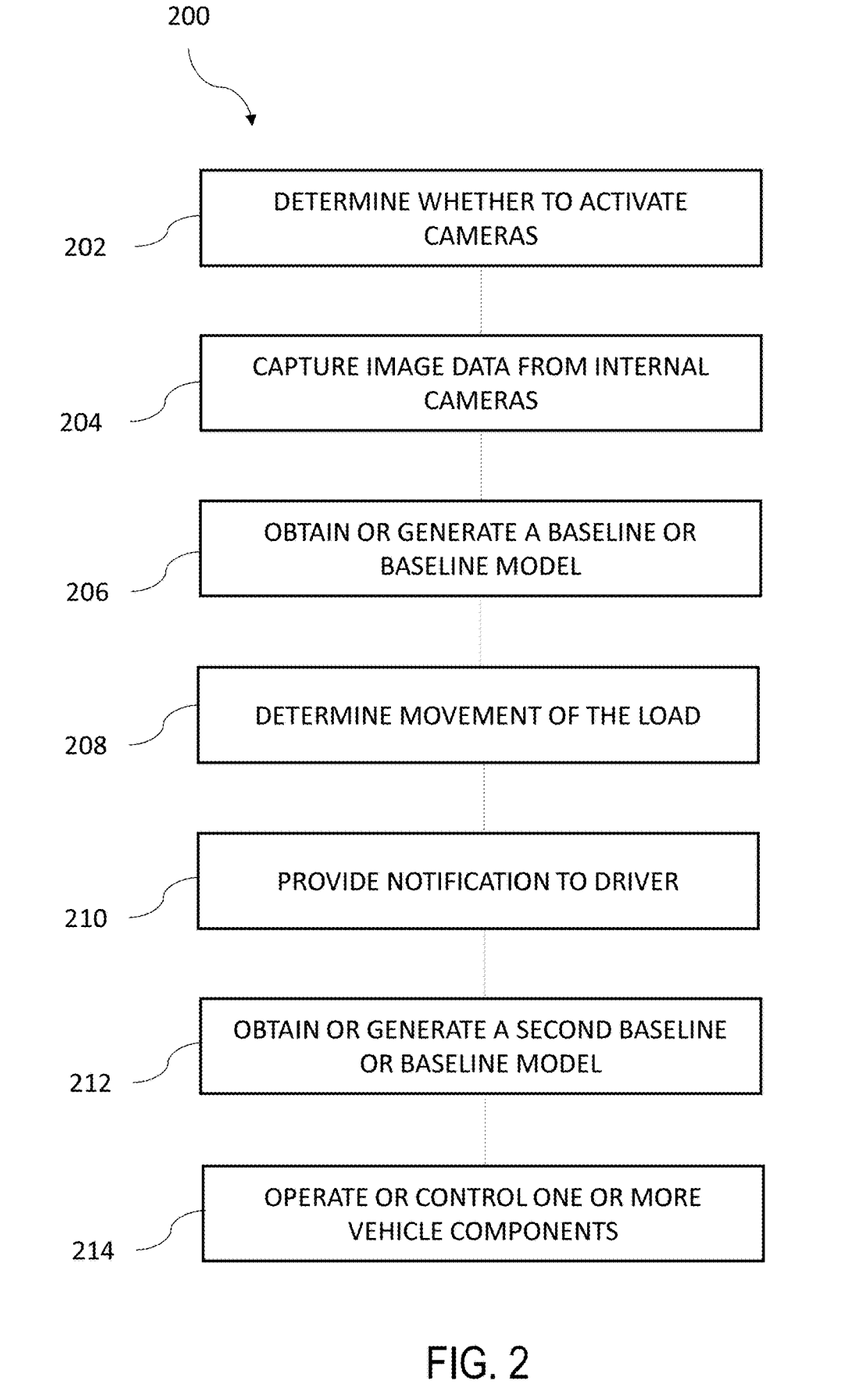
FIG. 2 is a flow diagram of an example process for monitoring an activity using the monitoring system of FIG. 1 according to an aspect of the invention.

FIG. 2 is a flow diagram of an example process 200 for capturing the image data to use to detect an activity. One or more computers or one or more data processing apparatuses, for example, the ECU 108 of the monitoring system 100 of FIG. 1, appropriately programmed, may implement the process 200.

The monitoring system 100 determines whether to activate the internal cameras 116a and/or the external cameras 116b (202). The monitoring system 100 may determine whether to activate the internal cameras 116a and/or the external cameras 116b based on the activity of one or more users within the vehicle 102. The monitoring system 100 may automatically be activated once the vehicle 102 is started. Alternatively, the monitoring system 100 may be manually activated by the driver, a front passenger, or by a remote user of an autonomous vehicle. For instance, the monitoring system 100 may determine whether to activate the internal cameras 116a and/or the external cameras 116b based on user input via the user interface 122. In various embodiments, the monitoring system 100 may determine whether to activate the internal cameras 116a and/or the external cameras 116b in response to a key placed in the ignition of the vehicle 102 or in response to the vehicle 102 being placed in a drive gear. The monitoring system 100 may determine whether to activate the internal cameras 116a based on the presence of the load within the vehicle 102 or in the bed of the vehicle 102. Once the monitoring system 100 activates the one or more internal cameras 116a, the monitoring system 100 captures image data using the one or more internal cameras 116a and/or the external cameras 116b (204).

In particular, the one or more internal cameras 116a may capture image data of the environment within the vehicle 102. The one or more internal cameras 116a may be positioned within an interior of the vehicle 102 and directed toward the interior cabin of the vehicle 102 to monitor or capture image data of the load within the vehicle 102. Each of the one or more internal cameras 116a may be directed to different portions of the interior cabin of the vehicle 102, such as toward the back of the front cabin, toward the front of one or more rows of seats in the rear cabin, in the cargo area behind the seats, or outward toward the bed of a truck. The one or more cameras 116a may also be positioned within a trunk of the vehicle 102 to capture image data within the trunk. The image data captured by the one or more internal cameras 116a may be a single frame image and/or a multi-frame video. The single frame image and/or the multi-frame video may be stored or buffered in the memory 110. Different perspectives and/or views may be captured and later stitched, merged or otherwise combined to form a panoramic image and/or video.

Moreover, the one or more external cameras 116b may capture image data of the surrounding environment outside the vehicle 102. The one or more external cameras 116b may be positioned on an exterior of the vehicle 102. Each of the one or more external cameras 116b may capture a different image of a different perspective of the surrounding environment outside the vehicle 102, including the load in the bed of the vehicle 102, such that together all of the one or more external cameras 116b may capture a 360 degrees perspective view of the surrounding environment. The different images may be later stitched, merged or otherwise combined to form a panoramic image and/or video.

Once the monitoring system 100 begins to capture image data to monitor for activity, the monitoring system 100 obtains or generates a baseline or a baseline model of the load and the initial position of the load (206). The baseline or the baseline model is used to determine or otherwise detect certain movement of the load. For example, the monitoring system 100 may capture images for the first 100 meters of travel before establishing the baseline. As such, the background noise may be eliminated and the monitoring system 100 determines the initial position of the load. The distance, time, or other measure of amount or number of images captured to determine the baseline may be set by the OEM and/or may be a calibratable value based on the desired program, how big the truck bed is, the particular camera view available in the vehicle 102, etc. The generation and use of the baseline or the baseline model provides a control model for the monitoring system 100 to compare the current situation with the baseline situation, which allows the monitoring system 100 to determine when an activity, change or shift has occurred.

Figure 5:
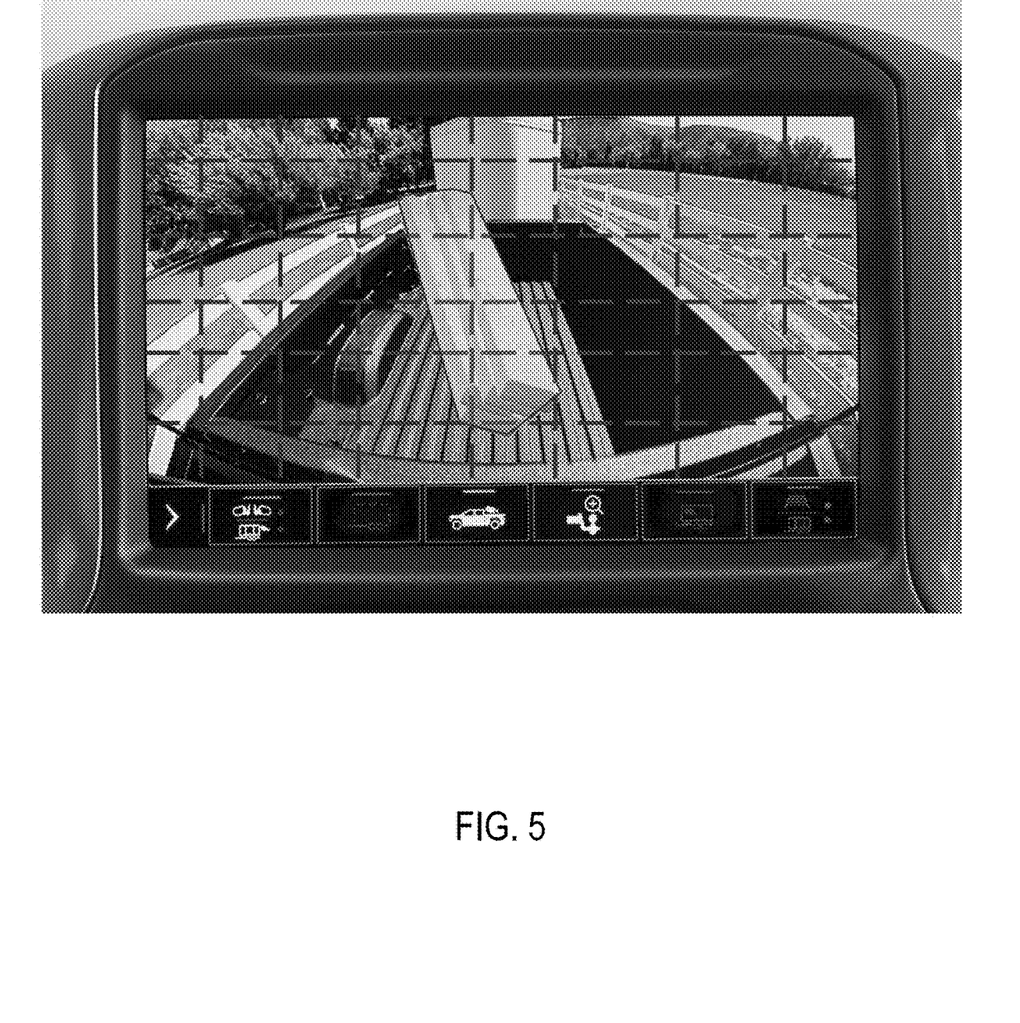
FIG. 5 shows an example illustration of a view from one or more external cameras of the monitoring system of FIG. 1 on the vehicle according to an aspect of the invention.

The monitoring system 100 recognizes the load from the image data. In order to recognize the load within the image data, the monitoring system 100 may segment, outline or otherwise map figures within the image data using multiple joints and segments (e.g., see FIG. 5). The segments may represent linear representations or outlines of the load and the joints may represent vertices, contours or other angles between the different segments.

The monitoring system 100 then determines the movement of the load (208). The activity of a load may include, for example, moving, shifting, falling over within the vehicle 102, and/or falling out of the vehicle 102. The monitoring system 100 tracks the segment or outline of the load across multiple frames of the image data taken over a period of time. The period of time in between the capture of different frames of the image data may be pre-configured or pre-set (e.g., every 1 or 2 seconds). The monitoring system 100 may determine the movement of the load has exceeded a first threshold. The first threshold may be a first distance (e.g., in both a lateral or longitudinal direction), a first number of segments, and/or a first rate of change (e.g., the load shifting too quickly indicates the load is not secured well).

In response to determining that the movement of the load has exceeded the first threshold, the monitoring system 100 provides a notification to the driver (210). The notification may be a visual message via the user interface 122. In various embodiments, the notification may be an audible warning. The visual message may include a prompt for user instruction. The visual message may include an image of the load detected, allowing the driver to view the change in position. The monitoring system 100 may prompt the driver to confirm/acknowledge the notification. Upon receipt of the notification, the driver may choose to pull over and readjust/resecure the load, or the driver may choose to instruct the monitoring system 100 to alert the driver if the movement of the load exceeds the second threshold. If the driver does not respond, the monitoring system 100 may similarly clear the message after a certain timeout duration, and continue to monitor the load until the load exceeds the second threshold. The set amount of time may be pre-configured or configured via user input through the user interface 122. The second threshold may be greater than the first threshold. For instance, the second threshold may be a second distance (e.g., in both a lateral or longitudinal direction) greater than the first distance, a second number of segments greater than the first number of segments, and/or a second rate of change greater than the first rate of change. The second threshold may indicate the load is over the edge of the bed of the truck and/or has fallen out of the vehicle 102.

Upon receipt of the notification, the driver may choose to instruct the monitoring system 100 to set a second baseline (212). The second baseline may be set as the current position of the load after the load shifts the first distance, for instance. The new orientation after the shift becomes the new baseline and the monitoring system 100 recaptures the images of the bed of the vehicle 102. Once enough images are captured to identify the new position, the monitoring system 100 overwrites the baseline position. Accordingly, the monitoring system 100 may continue to monitor the movement of the load and notify the driver when the load movement exceeds the first threshold, as measured from the new, second baseline position. The monitoring system 100 may continue to monitor the movement of the load until the driver indicates the issue has been resolved or until the vehicle 102 is turned off, or placed in park, for instance.

In various embodiments, the monitoring system 100 may operate or control one or more vehicle components in response to detecting a particular activity of the load (214). The monitoring system 100 may slow the vehicle 102 to a stop on the side of the roadway when the monitoring system 100 detects that the load shift may be dangerous to the driver or other drivers on the road (e.g., the load movement has exceeded a certain threshold indicating that the load may fall out). In another example, the monitoring system 100 may slow the vehicle 102 when the monitoring system 100 determines a certain turn will cause a certain amount of shift at a certain velocity, thus preventing the load from shifting out of the vehicle 102. In another example, the navigation unit 112 may inform the driver of a safe place to pull over nearby or reroute to the same location, in the case of an autonomous or semi-autonomous vehicle, when the monitoring system 100 detects that the load shift may be dangerous.

In some implementations, the monitoring system 100 connects with the external database 104 via the network 106. The external database 104 may be a traffic information database, for example. The monitoring system 100 may provide the current location of the vehicle 102 to the traffic information database, and in response, receive situational factors including the state of one or more traffic lights or signals within the vicinity of the current location of the vehicle 102. As such, the monitoring system 100 may inform the driver of a new route, or autonomously route the vehicle 102, to take a smoother course, requiring less turns, for instance.

Figure 6:
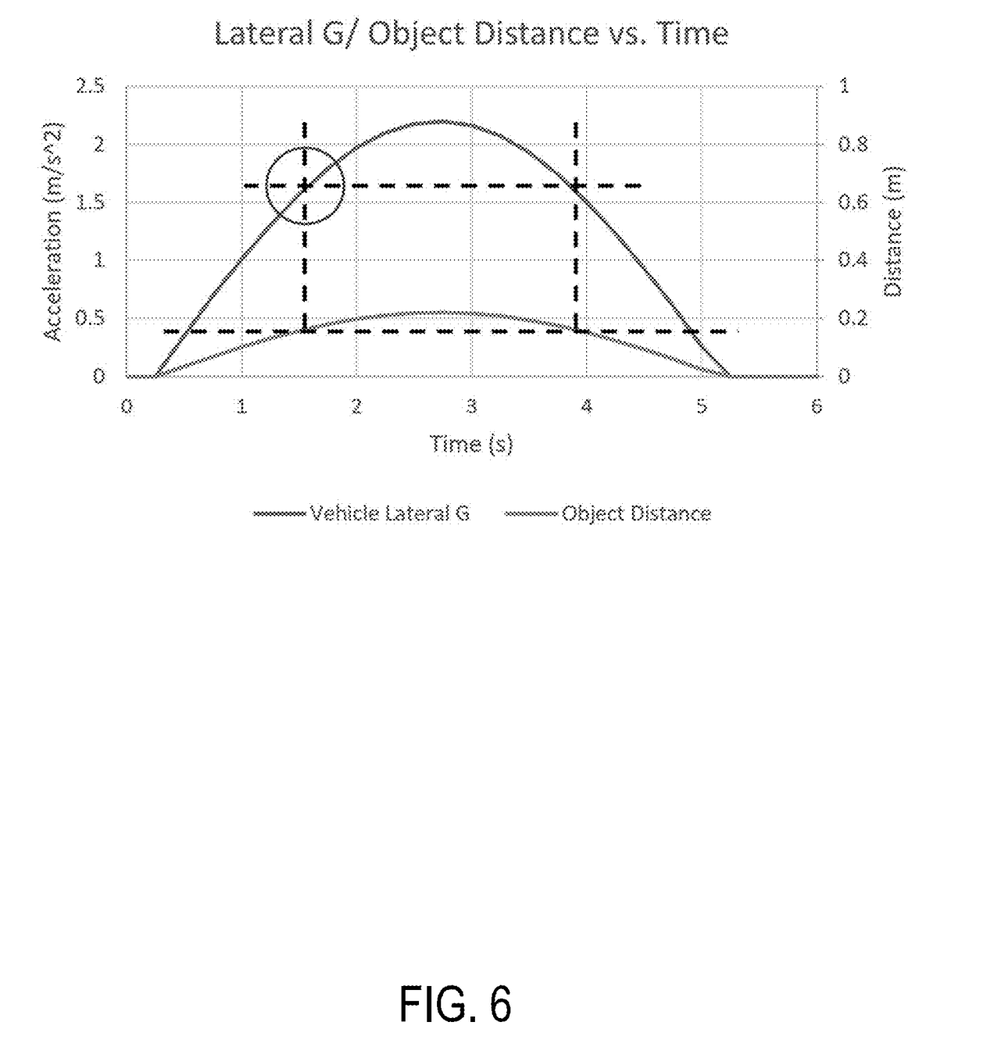
FIG. 6 shows an example illustration of a correlation of lateral movement of the vehicle with the movement of a load in the vehicle of the monitoring system of FIG. 1 on the vehicle according to an aspect of the invention.

The monitoring system 100 may be configured to correlate the lateral movement G of the vehicle 102 to the movement of the load (e.g., see FIG. 6). If the vehicle 102 is turning, the lateral movement of the vehicle is recorded along with the largest distance of travel for the load over time. Thus, a target maximum lateral acceleration may be set when the load movement exceeds the threshold so as to prevent further movement. Using either driver input route/destination, upcoming road condition via GPS, a forward-facing camera, etc., the monitoring system 100 is configured to calculate the vehicle speed limit and to not cause the lateral movement to go over the target maximum lateral acceleration. In an autonomous vehicle mode, the speed may be reduced to the set vehicle speed limit. Alternatively, a notification may be provided to the driver to indicate a distance before the turn depending on the speed traveling towards the turn and a target speed, thus allowing enough time to slow down without large deceleration and to prevent the load from shifting.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A monitoring system for a vehicle, comprising:
one or more cameras configured to capture image data including a load in or on the vehicle;
a memory configured to store the image data; and
an electronic control unit coupled to the one or more cameras and the memory and configured to:
obtain, from the one or more cameras, the image data including the load,
determine a movement of the load based on the image data,
provide a first notification when the movement of the load exceeds a first threshold, and
provide a second notification when the movement of the load exceeds a second threshold and the first notification is cleared.

2. The monitoring system of claim 1, wherein the one or more cameras include one or more external cameras configured to capture different views of an exterior of the vehicle.

3. The monitoring system of claim 1, wherein the one or more cameras include one or more internal cameras configured to capture different views of an interior of the vehicle.

4. The monitoring system of claim 1, wherein the electronic control unit is further configured to set a baseline of an initial position of the load based on the image data.

5. The monitoring system of claim 4, wherein the electronic control unit is further configured to determine the movement of the load based on a change in position of the load compared to the baseline.

6. The monitoring system of claim 1, further comprising an output device,
wherein the electronic control unit is further configured to notify a user via the output device when the movement of the load exceeds the first threshold.

7. The monitoring system of claim 6, wherein the output device comprises one or more displays.

8. The monitoring system of claim 7, wherein the electronic control unit is configured to notify the user of the output device that the movement exceeds the first threshold by displaying an icon corresponding to the movement on the output device.

9. The monitoring system of claim 7, wherein the one or more displays comprise a vehicle display including one or more of a head up display, a multi-information display, or an in-vehicle infotainment display located in a front compartment of the vehicle.

10. The monitoring system of claim 7, wherein the one or more displays include a mobile display located on a mobile device.

11. The monitoring system of claim 1, further comprising a user interface configured to receive commands from a user.

12. The monitoring system of claim 1, wherein the vehicle is an autonomous vehicle.

13. The monitoring system of claim 12, further comprising a navigation unit configured to obtain navigational map information including a current location of the vehicle,
wherein the electronic control unit is further configured to control the vehicle to a route when the monitoring system determines that the movement of the load exceeds the first threshold.

14. A method for notifying a user of an output device of a movement of a load within a vehicle, comprising:

obtaining, by a processor and from one or more cameras, image data of a compartment of the vehicle including the load;

determining, by the processor, a movement of the load within the compartment of the vehicle;

providing, by the processor, a first notification when the movement of the load exceeds a first threshold; and providing, by the processor, a second notification when the movement of the load exceeds a second threshold and the first notification is cleared.

15. The method of claim 14, further comprising setting a baseline of an initial position of the load based on the image data.

16. The method of claim 15, further comprising determining the movement of the load based on a change in position of the load compared to the baseline.

17. The method of claim 14, wherein the vehicle is an autonomous vehicle.

18. The method of claim 17, further comprising controlling the autonomous vehicle to a route in response to determining that the movement of the load exceeds the first threshold.

19. A monitoring system for a vehicle, comprising:

one or more cameras configured to capture image data including a load in or on the vehicle;

a memory configured to store the image data; and an electronic control unit coupled to the one or more cameras and the memory and configured to:

obtain, from the one or more cameras, the image data including the load, determine a movement of the load based on the image data, provide a first notification when the movement of the load exceeds a first threshold, and provide a second notification when the movement of the load exceeds a second threshold.

* * * * *